(12) United States Patent
Takagi et al.

(10) Patent No.: US 11,081,270 B2
(45) Date of Patent: Aug. 3, 2021

(54) PERMANENT MAGNET AND METHOD OF MANUFACTURING MOTOR

(71) Applicant: TDK Corporation, Tokyo (JP)

(72) Inventors: Nobuo Takagi, Tokyo (JP); Yousuke Hitomi, Tokyo (JP)

(73) Assignee: TDK Corporation, Tokyo (JP)

( * ) Notice: Subject to any disclaimer, the term of this patent is extended or adjusted under 35 U.S.C. 154(b) by 292 days.

(21) Appl. No.: 16/389,137

(22) Filed: Apr. 19, 2019

(65) Prior Publication Data

US 2019/0326042 A1 Oct. 24, 2019

(30) Foreign Application Priority Data

Apr. 24, 2018 (JP) .............................. JP2018-083124

(51) Int. Cl.
*H01F 7/02* (2006.01)
*H02K 15/12* (2006.01)
*H02K 15/03* (2006.01)
*H02K 1/27* (2006.01)
*C09J 5/06* (2006.01)
*C09J 5/08* (2006.01)

(52) U.S. Cl.
CPC .............. *H01F 7/0221* (2013.01); *C09J 5/06* (2013.01); *C09J 5/08* (2013.01); *H01F 7/021* (2013.01); *H02K 1/276* (2013.01); *H02K 15/03* (2013.01); *H02K 15/12* (2013.01)

(58) Field of Classification Search
CPC .............. H01F 7/0221; C09J 5/06; C09J 5/08
See application file for complete search history.

(56) References Cited

U.S. PATENT DOCUMENTS

2020/0161945 A1* 5/2020 Matsubara ............. H02K 15/12

FOREIGN PATENT DOCUMENTS

JP 2005-012859 A 1/2005
WO WO-2017/171061 A1 10/2017

* cited by examiner

*Primary Examiner* — Ramon M Barrera
(74) *Attorney, Agent, or Firm* — Faegre Drinker Biddle & Reath LLP

(57) ABSTRACT

A permanent magnet includes a magnet member, and an adhesive layer covering a surface of the magnet member, wherein the adhesive layer includes a resin and a plurality of foaming agents, and wherein at least part of the foaming agents protrudes from a surface of the resin.

6 Claims, 9 Drawing Sheets

PERMANENT MAGNET AND METHOD OF MANUFACTURING MOTOR

TECHNICAL FIELD

The present invention relates to a permanent magnet and a method of manufacturing a motor.

BACKGROUND

Permanent magnets such as rare earth magnets, ferrite magnets and alnico magnets are components of, for example, motors or actuators, and are used for various types of devices such as hybrid cars, electric cars, hard disk drives, magnetic resonance imaging (MRI) devices, smart phones, digital cameras, flat-screen TVs, scanners, air conditioners, heat pumps, refrigerators, vacuum cleaners, washing and drying machines, elevators and wind power generators. Along with the refinement, miniaturization or improvement in performance of these devices, the space where a permanent magnet is housed in the device is limited. Therefore, in the manufacturing process of various devices, the permanent magnet needs to be inserted into a narrow housing portion and then be fixed inside the housing portion. For example, in the method of manufacturing a rotor described in the patent literature 1 listed below, a permanent magnet coated with an adhesive containing an expanding agent is inserted into a housing hole (housing portion) formed in a rotor core. Then, the expansion agent expands as the adhesive is heated. The entire adhesive expands and the adhesive cures. As a result, the permanent magnet is bonded to the inner wall of the housing hole.

Patent literature 1: WO2017/171061 A

SUMMARY

As shown in the above-mentioned patent literature 1, in the course of movement of the permanent magnet from the opening portion of the housing hole to a desired position inside the housing hole, it is desirable that the surface of the adhesive is constantly away from the inner wall of the housing hole while the surface of the adhesive faces the inner wall of the housing hole in order to prevent contact between the adhesive and the housing hole. However, since the adhesive before curing has adhesiveness, the adhesive is easily caught on the opening portion or the inner wall of the housing hole in the course of movement of the permanent magnet. That is, the adhesive accidentally comes into contact with the housing hole before the permanent magnet reaches the desired position in the housing hole. For example, since a rotor core is made from a plurality of stacked silicon steel sheets and the end of part of the silicon steel sheets protrudes from the inner wall of the housing hole of the rotor core, the adhesive is easily caught on the inner wall of the housing hole. Also, since the adhesive before curing is soft, due to the contact with the inner wall of the housing hole, the adhesive deforms, at least part of the adhesive peels off from the permanent magnet, or the adhesive that has peeled off from the permanent magnet accidentally adheres to the opening portion or the inner wall of the housing hole. As a result, there is a possibility that the permanent magnet is not sufficiently fixed at the desired position in the housing hole. These problems arising from the contact between the adhesive and the opening portion or the inner wall of the housing hole are expressed as "adhesion failure" in the following.

Along with the refinement, miniaturization or improvement of performance of various devices using permanent magnets, the clearance between the surface of the adhesive and the inner wall of the housing portion tends to be narrower. As the clearance decreases, an adhesion failure is likely to occur. The adhesion failure causes a reduced yield rate, lower performance, and a failure of various devices.

The present invention has been made in view of the above circumstances, and it is an object of the present invention to provide a permanent magnet capable of suppressing an adhesion failure and a method of manufacturing a motor.

A permanent magnet according to an aspect of the present invention includes a magnet member and an adhesive layer covering a surface of the magnet member. The adhesive layer includes a resin and a plurality of foaming agents, and at least part of the foaming agents protrudes from a surface of the resin.

At least part of the resin may be a semi-cured material.

At least part of the resin may be a thermosetting resin.

$\varphi$ may be the width of at least part of the foaming agents in the direction perpendicular to the surface of the magnet member, T may be the thickness of the resin in the direction perpendicular to the surface of the magnet member, and T may be $0.5\varphi$ or more and less than $\varphi$.

A method of manufacturing a motor according to an aspect of the present invention includes: an preparation step of obtaining a mixture containing a thermosetting resin and a plurality of foaming agents; a printing step of applying the mixture to a surface of a magnet member to form an adhesive layer on the surface of the magnet member; a first heating step of, by heating the adhesive layer, semi-curing the thermosetting resin contained in the adhesive layer to obtain a permanent magnet; a housing step of inserting, after the first heating step, the permanent magnet into a housing hole formed in a rotor core; and a second heating step of, by heating the adhesive layer after the housing step, foaming the foaming agent contained in the adhesive layer, and further curing the thermosetting resin contained in the adhesive layer, wherein $\varphi$ is a width of at least part of the foaming agents in a direction perpendicular to the surface of the magnet member, wherein T is a thickness of the resin in the direction perpendicular to the surface of the magnet member, and wherein in the printing step, $T/\varphi$ is adjusted to a value greater than 0 and less than 1. The mixture may be applied to the surface of the magnet member by screen printing in the printing step.

A permanent magnet capable of suppressing an adhesion failure and a method of manufacturing a motor are provided owing to the present invention.

DETAILED DESCRIPTION

Figure 1:
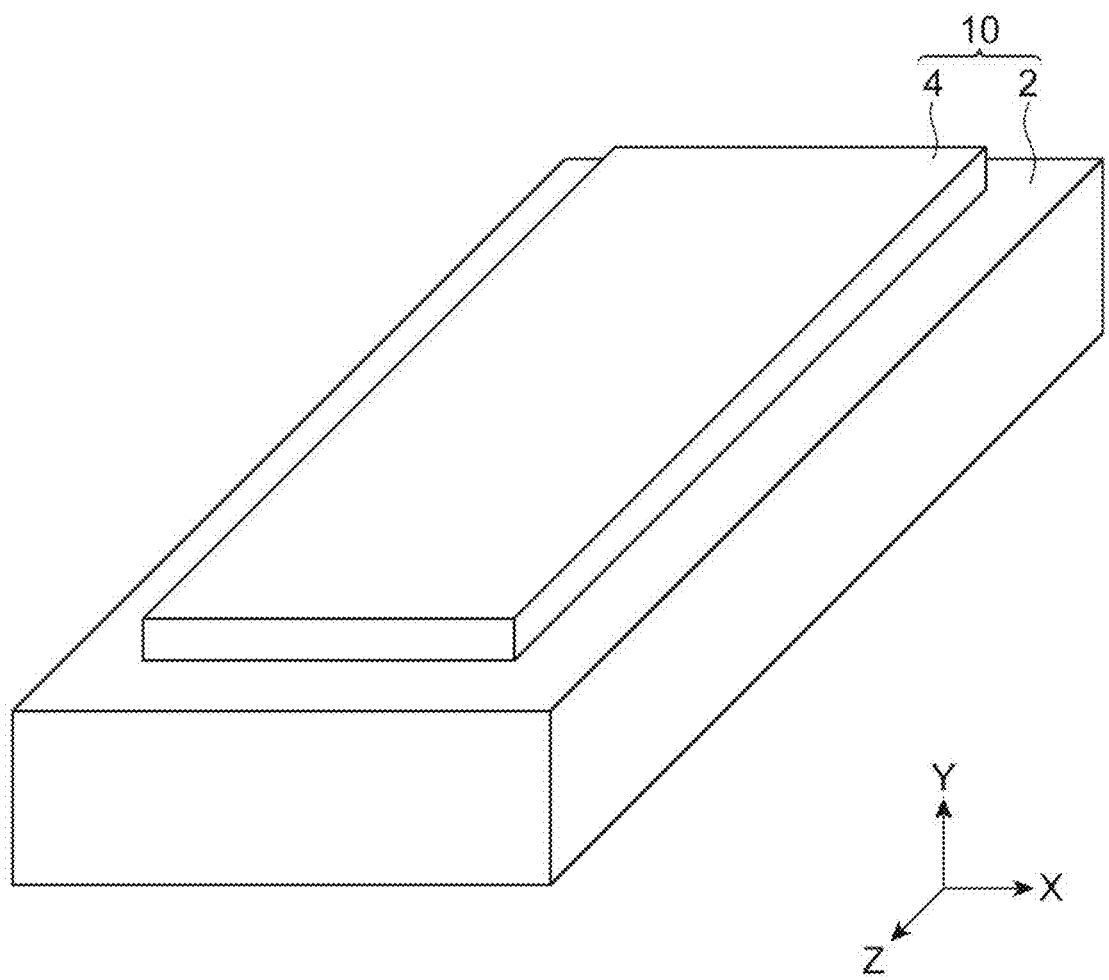
FIG. 1 is a perspective view of a permanent magnet according to an embodiment of the present invention.

Hereinafter, preferred embodiments of the present invention will be described with reference to the drawings. In the drawings, like components are denoted by like reference numerals. The present invention is not limited to the following embodiments. X, Y and Z shown in each figure mean three coordinate axes orthogonal to each other. The directions indicated by the X, Y and Z coordinate axes in each figure are common to all figures.

(Permanent Magnet)

Figure 2:
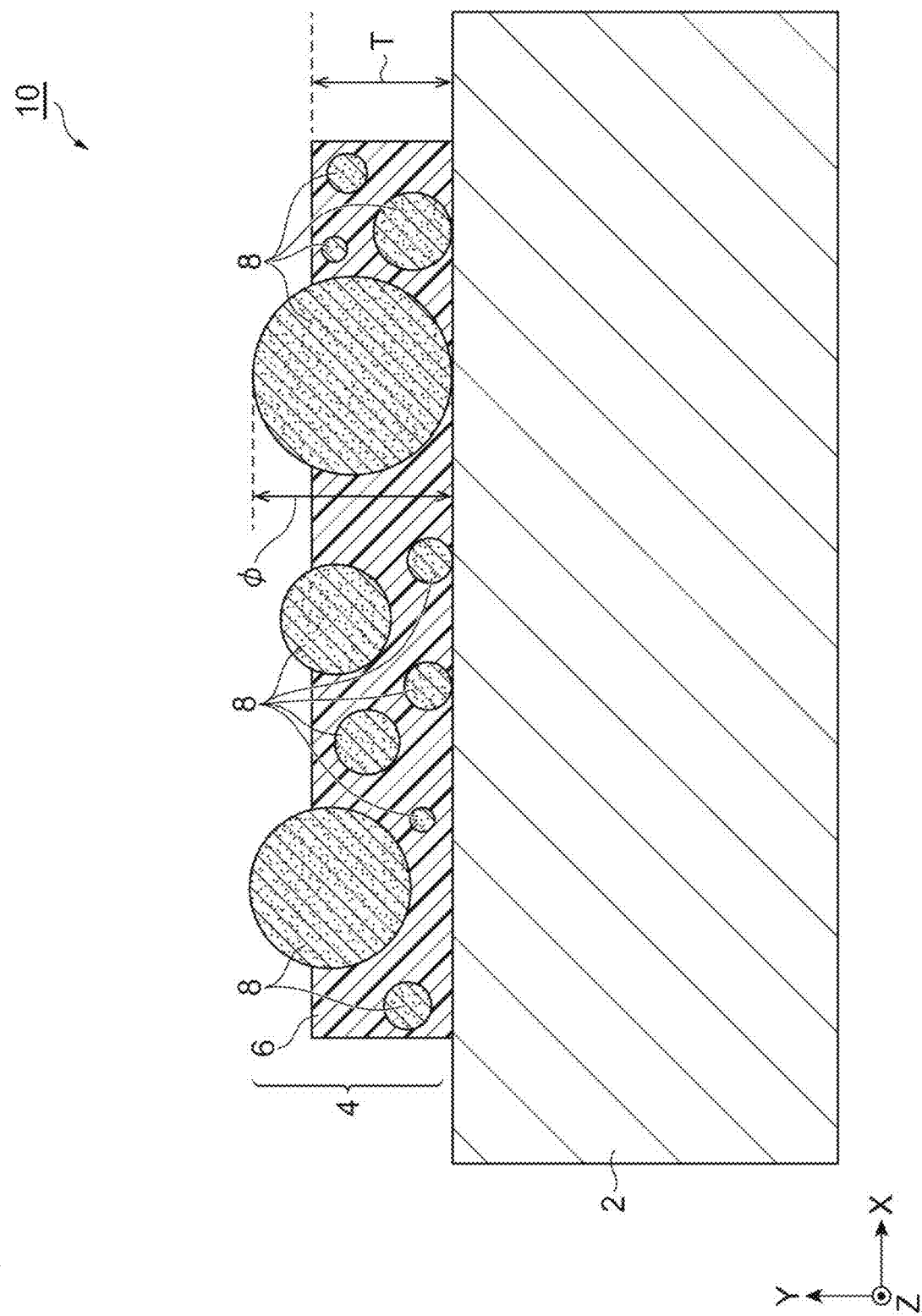
FIG. 2 is a cross-sectional view of a permanent magnet in a direction perpendicular to the surface of an adhesive layer shown in FIG. 1.

As shown in FIG. 1, a permanent magnet 10 according to the present embodiment includes a magnet member 2, and an adhesive layer 4 covering at least part of the surface of the magnet member 2. As shown in FIG. 2, the adhesive layer 4 includes a resin 6 and a plurality (a large number) of foaming agents 8. At least part of the foaming agents 8 protrudes from the surface of the resin 6.

In the process of inserting the permanent magnet 10 into a housing hole provided in each of the above-described various devices, the surface of the adhesive layer 4 faces the inner wall of the housing hole and the surface of the adhesive layer 4 is maintained substantially parallel to the inner wall of the housing hole. That is, the permanent magnet 10 is inserted into the housing hole along the inner wall of the housing hole in order to prevent contact between the moving permanent magnet 10 and the housing hole. However, before a permanent magnet 10 reaches a desired position in the housing hole, there is a possibility that the surface of the adhesive layer 4 accidentally comes into contact with the opening portion or the inner wall of the housing hole. If the foaming agents 8 did not protrude from the surface of the resin 6 and all the foaming agents 8 were completely embedded in the resin 6, the resin 6 constituting the surface of the adhesive layer 4 would directly contact the inner wall of the housing hole. That is, surface contact between the flat adhesive layer 4 and the housing hole would occur. Since the resin 6 before curing has adhesiveness, the resin 6 is easily caught on the inner wall of the housing hole due to the surface contact. Since the resin 6 before curing is soft, the adhesive layer 4 is deformed or at least part of the adhesive layer 4 peels off from the magnet member 2 due to the contact with the opening portion or the inner wall of the housing hole. The resin 6 that has peeled off from the magnet member 2 may be accidentally attached to the opening portion or the inner wall of the housing hole. As a result, there is a possibility that the permanent magnet 10 is not sufficiently fixed at the desired position in the housing hole.

On the other hand, since at least part of the foaming agents 8 protrudes from the surface of the resin 6, the foaming agents 8, instead of the resin 6, are likely to come into direct contact with the inner wall of the housing hole and the resin 6 itself is less likely to come into direct contact with the inner wall of the housing hole. That is, since the foaming agents 8 protrude from the surface of the resin 6, point contact between the adhesive layer 4 and the housing hole is likely to occur and surface contact between the adhesive layer 4 and the housing hole is less likely to occur. For example, in a case where the foaming agents 8 are spherical, since the spherical surfaces of the foaming agents 8 protruding from the surface of the resin 6 function as a guide, the permanent magnet 10 is easily inserted into the housing hole. Further, since the foaming agents 8 themselves having no adhesiveness come into direct contact with the inner wall of the housing hole, the adhesive layer 4 is less likely to be caught on the opening portion and the inner wall of the housing hole. Even if a small amount of resin 6 is attached to the surfaces of the foaming agents 8 protruding from the resin 6, since surface contact between the resin 6 itself and the housing hole is less likely to occur, the adhesive layer 4 is less likely to be caught on the opening portion and the inner wall of the housing hole. For the above reasons, deformation and peeling of the adhesive layer 4 are suppressed. That is, an adhesion failure is suppressed by the present embodiment. Since the adhesion failure is suppressed, the clearance between the permanent magnet 10 and the inner wall of the housing hole can be reduced.

After the permanent magnet 10 reaches the desired position in the housing hole, the entire adhesive layer 4 expands by foaming the foaming agents 8 contained in the adhesive layer 4, thereby filling the gap (clearance) between the magnet member 2 and the inner wall of the housing hole. As the resin 6 contained in the adhesive layer 4 is further cured in parallel with expanding the foaming agents 8, the magnet member 2 is adhered to the inner wall of the housing hole. That is, the permanent magnet 10 is fixed at the desired position in the housing hole.

The adhesive layer 4 may cover only part of a face of the magnet member 2. The adhesive layer 4 may cover an entirety of a face of the magnet member 2. The adhesive layer 4 may entirely cover the surface of the magnet member 2. Only part of the foaming agents 8 may protrude from the surface of the resin 6, and the remaining foaming agents 8 may be embedded in the resin 6. All the foaming agents 8 may protrude from the surface of the resin 6.

Part or the whole of the resin 6 may be a semi-cured material. That is, part or the whole of the resin 6 may be a B stage resin. Since part or the whole of the resin 6 is a semi-cured material, the adhesiveness of the resin 6 is lower than the adhesiveness of the uncured resin 6. As a result, the handling of the permanent magnet 10 becomes easier, and the adhesive layer 4 is more unlikely to be caught on the opening portion and the inner wall of the housing hole. The lower the content of the organic solvent in the adhesive layer 4 is, the less easily the adhesiveness of the resin 6 is impacted by use environment (for example, temperature). Therefore, part or the whole of the resin 6 may be dried. The content of the organic solvent in the adhesive layer 4 may be 0% by mass. Part or the whole of the resin 6 may be a dried semi-cured material.

Part or the whole of the resin may be a thermosetting resin. When part or the whole of the resin is a thermosetting resin, heating the adhesive layer 4 after the permanent magnet 10 reaches a desired position in the housing hole makes it easier to completely cure the resin 6 contained in the adhesive layer 4 evenly. The resin contained in the adhesive layer 4 may be at least one kind selected from the group consisting of, for example, an epoxy resin, a phenol resin, a melamine resin, a urea resin, an unsaturated polyester resin, an alkyd resin, a polyurethane resin, a polyimide resin, a silicone resin, a cyanoacrylate resin, a modified acrylic resin, and a diallyl phthalate resin. The adhesive layer 4 may contain plural kinds of resin. The adhesive layer 4 may further contain, in addition to the resin, a curing agent, a curing accelerator, a diluent (organic solvent), a colorant, a filler, a coupling agent, a defoaming agent, a flame retardant and the like. The curing agent may be, for example, an acid anhydride curing agent, a dicyandiamide (DICY) curing agent, or an aromatic amine curing agent. The curing accelerator may be, for example, an imidazole curing accelerator or a tertiary amine curing accelerator. The diluent may be, for example, a reactive diluent or a non-reactive diluent. The colorant may be, for example, an organic colorant or an inorganic colorant (such as white titanium oxide). The filler may be, for example, silica, calcium carbonate, aluminum hydroxide, talc, alumina, or barium sulfate.

The foaming agent may be at least one kind selected from the group consisting of foamable beads, sodium carbonate, calcium carbonate, ammonium carbonate, sodium hydrogen carbonate, aluminum sulfate, diazo aminobenzene, and N,N'-dinitrosopentamethylene tetramine. The foamable beads may contain a shell comprising a thermoplastic polymer, and a hydrocarbon having a low boiling point contained in the shell. The hydrocarbons contained in the foamable beads may be, for example, butane, pentane, hexane or the like. The thermoplastic polymer comprising the shell may be, for example, an acrylonitrile copolymer. The adhesive layer 4 may contain plural types of foaming agents having different compositions. The foaming agent may be expandable particles. The shape of the expandable particles may be, for example, a sphere, a column, a cone, or a polyhedron. The foaming agent may comprise plural types of expandable particles having different shapes. The content of the foaming agent in the adhesive layer 4 is not limited. The content of the foaming agent in the adhesive layer 4 may be, for example, 1 mass % or more and 30 mass % or less. The remainder of the adhesive layer 4, excluding the foaming agent, may be a resin. The remainder of the adhesive layer 4, excluding the foaming agent, may include a resin, a curing agent, a curing accelerator, a diluent, a colorant, a filler, a coupling agent, a defoaming agent, a flame retardant, and the like.

As shown in FIG. 2, $\varphi$ is the width (height) of a foaming agent 8 in a direction (Y axis direction) perpendicular to the surface of the magnet member 2. $\varphi$ may be the average value of the width of the foaming agents 8 in the direction perpendicular to the surface of the magnet member 2. $\varphi$ may be the particle diameter (diameter) of the foaming agents 8. $\varphi$ may be the average particle diameter or the median diameter (D50) of the foaming agents 8. T is the thickness of the resin 6 in the direction perpendicular to the surface of the magnet member 2. T may be the thickness of a portion of the adhesive layer 4 where the foaming agents 8 do not protrude from the surface of the resin. T may be the thickness of the portion of the adhesive layer 4 where the entire foaming agents 8 are embedded in the resin 6. The surface of the resin 6 may be flat, and the thickness of the resin 6 may be substantially even. T/$\varphi$ is greater than 0 and less than 1. T may be 0.5$\varphi$ or more and less than $\varphi$. When T is 0.5$\varphi$ or more, more than a half of the surface of the foaming agents 8 is easily covered with the resin 6, and the foaming agents 8 are less likely to be detached from the adhesive layer 4. When T is less than $\varphi$, the foaming agents 8 protrude from the surface of the resin 6. $\varphi$ is not limited. $\varphi$ may be, for example, 5 μm or more and 100 μm or less. T is not limited. T may be, for example, 5 μm or more and 50 μm or less. The thickness of the magnet member 2 is not limited. The thickness of the magnet member 2 may be, for example, 1 mm or more and 50 mm or less.

The magnet member 2 may be a sintered magnet, a bonded magnet, or a hot processed magnet. The magnet member 2 may be a rare earth magnet, a ferrite magnet, an Al—Ni—Co alloy magnet (Alnico magnet), or an Fe—Cr—Co alloy magnet. The main phase of the rare earth magnet may be, for example, $Nd_2Fe_{14}B$, $SmCo_5$, $Sm_2Co_{17}$, $Sm_2Fe_{17}N_3$, $Sm_1Fe_7N_x$, or $PrCo_5$. The ferrite magnet may be spinel ferrite, hexagonal ferrite (magnetoplumbite type ferrite), or garnet ferrite. The spinel ferrite is represented as, for example, $AFe_2O_4$, where A may be at least one kind selected from the group consisting of Mn, Co, Ni, Cu and Zn. The hexagonal ferrite is represented by, for example, $A'Fe_{12}O_{19}$, where A' may be at least one kind selected from the group consisting of Ba, Ca, Bi, Pb and rare earth elements. Garnet ferrite is represented as, for example, $RFe_5O_{12}$, where R may be at least one rare earth element.

The method of manufacturing the permanent magnet 10 includes at least a preparation step and a printing step. The method of manufacturing the permanent magnet 10 may further include a first heating step performed after the printing step.

In the preparation step, a mixture containing the thermosetting resin and the foaming agent is obtained. The mixture may further contain an organic solvent. Since the mixture contains an organic solvent, the viscosity of the mixture tends to decrease, and the mixture is easily applied to the surface of the magnet member 2 in the printing step. The organic solvent may be at least one kind selected from the group consisting of acetone, methyl ethyl ketone, methyl isobutyl ketone, benzene, toluene, carbitol acetate, butyl carbitol acetate, cyclohexanone and xylene. However, the lower the content of the organic solvent in the adhesive layer 4 is, the more easily adhesiveness of the resin 6 is reduced and the more easily an adhesion failure is suppressed. When the adhesive layer 4 contains an organic solvent, a step for drying the adhesive layer 4 (removal of the organic solvent) is required, and the manufacturing cost increases. Therefore, the mixture may not contain an organic solvent.

In the printing step, the mixture is applied to part or the whole of the surface of the magnet member 2 to form an adhesive layer 4 on the surface of the magnet member 2. The mixture may be applied to the surface of the magnet member by screen printing. The mixture may be applied to the surface of the magnet member by methods other than screen printing. In the printing step, T/$\varphi$ is adjusted to a value greater than 0 and less than 1. As a result, at least part of the foaming agents 8 protrudes from the surface of the resin 6. Preferably, T/$\varphi$ is adjusted to a value which is 0.5 or more and less than 1. As a result, more than a half of the surface of the foaming agents 8 is easily covered with the resin 6, and the foaming agents 8 are less likely to be detached from the adhesive layer 4. As described above, $\varphi$ is the width of at least part of the foaming agents 8 in the direction perpendicular to the surface of the magnet member 2. $\varphi$ may be the average value of the width of the foaming agents 8 in the direction perpendicular to the surface of the magnet member 2. $\varphi$ may be the average particle diameter or the median diameter (D50) of the foaming agents 8. T is the thickness of the resin 6 in the direction perpendicular to the surface of the magnet member 2.

Figure 3:
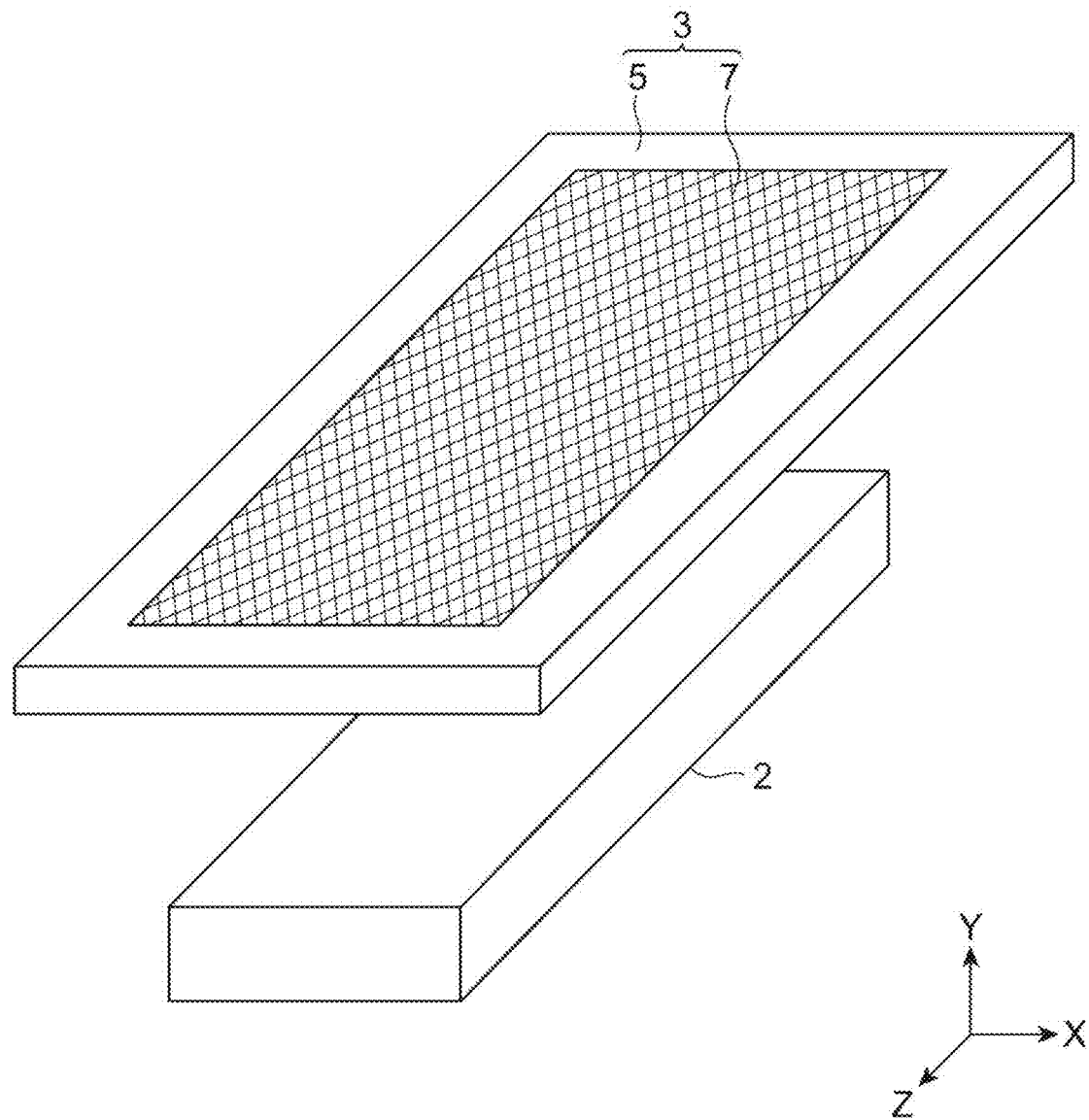
FIG. 3 is a perspective view of a screen mesh and a magnet member used for manufacturing a permanent magnet according to an embodiment of the present invention.
Figure 4:
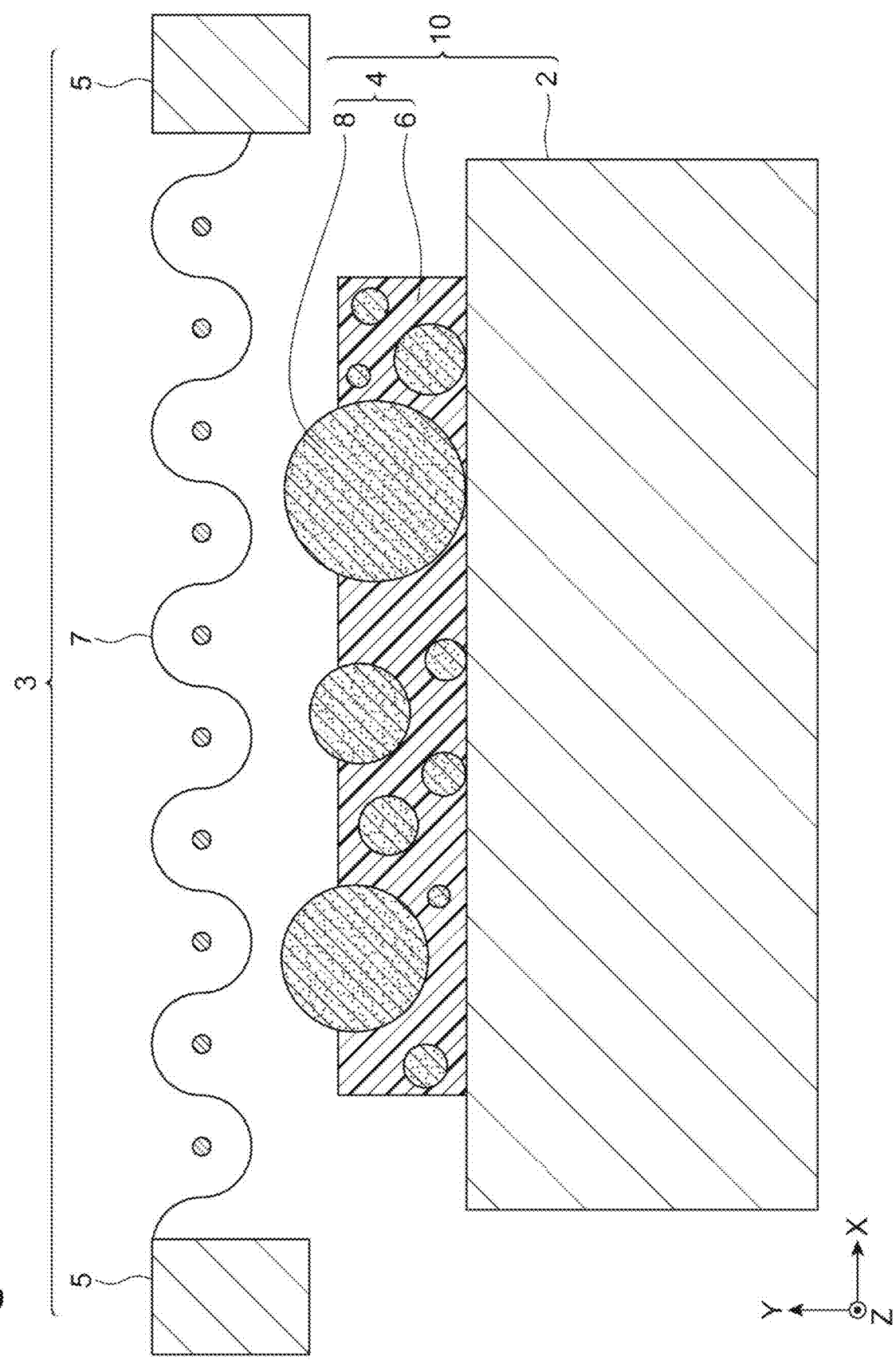
FIG. 4 is a cross-sectional view of the screen mesh and the permanent magnet in the direction perpendicular to the surface of the adhesive layer formed using the screen mesh shown in FIG. 3.

In the printing step, a screen mesh 3 as shown in FIG. 3 may be used. The screen mesh 3 includes a frame 5, and a mesh 7 stretched over an opening portion on the inner side of the frame 5. As shown in FIG. 4, in a state where the screen mesh 3 is superimposed on the magnet member 2, the inside of the frame 5 includes a region where the adhesive layer 4 is formed. That is, the adhesive layer 4 is formed in the region where the mesh 7 overlaps on the surface of the magnet member 2.

In the printing step, the mesh 7 is superimposed on the surface of the magnet member 2. Then, the mesh 7 is pressed against the surface of the magnet member 2 while applying the mixture to part or the whole of the surface of the mesh 7 using a squeegee. As a result, the mixture extruded from the gaps of the mesh 7 is applied to the surface of the magnet member 2, and the adhesive layer 4 is framed on the surface of the magnet member 2. The area and shape of the adhesive layer 4 are easily controlled by the area and shape of the mixture applied to the mesh 7. The volume of the adhesive layer 4 is easily controlled by adjusting the volume or mass of the mixture used in the printing step. With the control of the area and the volume of the adhesive layer 4, the thickness T and T/φ of the resin 6 are easily controlled. A foaming agent having an excessively large φ among the foaming agents contained in the mixture is likely to be detached from the adhesive layer 4. However, the foaming agent with excessively large φ is sieved by the mesh 7, and is removed from the mixture. That is, by adjusting the aperture of the mesh 7, the foaming agents 8 having excessively large φ can be removed from the mixture. As the foaming agents 8, foaming agents 8 having a desired particle diameter φ and particle size distribution may be preselected. By the above method, in the printing step, t/φ is easily adjusted to a value greater than 0 and less than 1. That is, in the printing step, the foaming agents 8 protrude from the surface of the resin 6.

The advantages of the screen printing include that the thickness of the resin 6 in the adhesive layer 4 tends to be even and that the surface of the resin 6 excluding the protruding foaming agents 8 tends to be flat, even when the surface of the magnet member 2 has irregularities. If a mixture is applied to the surface of the magnet member 2 using a nozzle or the adhesive layer 4 is transferred to the surface of the magnet member 2, due to the unevenness of the surface of the magnet member 2 (roughness of the surface of the magnet member 2), the resin 6 is less likely to have an even thickness and to have a flat surface.

When the adhesive layer 4 is formed from a mixture containing an organic solvent, part or the whole of the organic solvent may be removed from the adhesive layer 4 by drying the adhesive layer 4 after the printing step. By removing the organic solvent, the adhesiveness of the resin 6 is easily reduced and an adhesion failure is likely to be suppressed.

In the first heating step after the printing step, part or the whole of the thermosetting resin contained in the adhesive layer 4 is semi-cured by heating the adhesive layer 4. Since part or the whole of the resin 6 is a semi-cured material, the adhesiveness of the resin 6 is lower than the adhesiveness of the uncured resin 6, and the adhesive layer 4 is more unlikely to be caught on the inner wall of the housing hole. In the first heating step, the adhesive layer 4 may be heated at such a temperature at which foaming of the foaming agents 8 is suppressed. For example, in the first heating step, the adhesive layer 4 may be heated at 50° C. or more and 100° C. or less. In the first heating step, the adhesive layer 4 may be heated for such a time in which foaming of the foaming agents 8 is suppressed. The time for heating the adhesive layer 4 at the above temperature in the first heating step may be 5 minutes or more and 60 minutes or less. When the adhesive layer 4 contains an organic solvent, drying (removal of organic solvent) of the adhesive layer 4 and semi-curing of thermosetting resin may be performed in parallel by applying heat in the first heating step.

When the permanent magnet 10 manufactured through the above steps is shipped, the surface of the adhesive layer 4 may be covered with a peelable protective sheet in order to suppress contamination of the surface of the adhesive layer 4 (decrease in adhesive strength of the adhesive layer 4). For the same purpose, the permanent magnet 10 may be housed in a case, and the permanent magnet 10 may be fixed in the case at a portion of the surface of the permanent magnet 10 where the adhesive layer 4 is not formed (the surface on which the magnet member 2 itself is exposed).

(Method of Manufacturing Motor)

Figure 5:
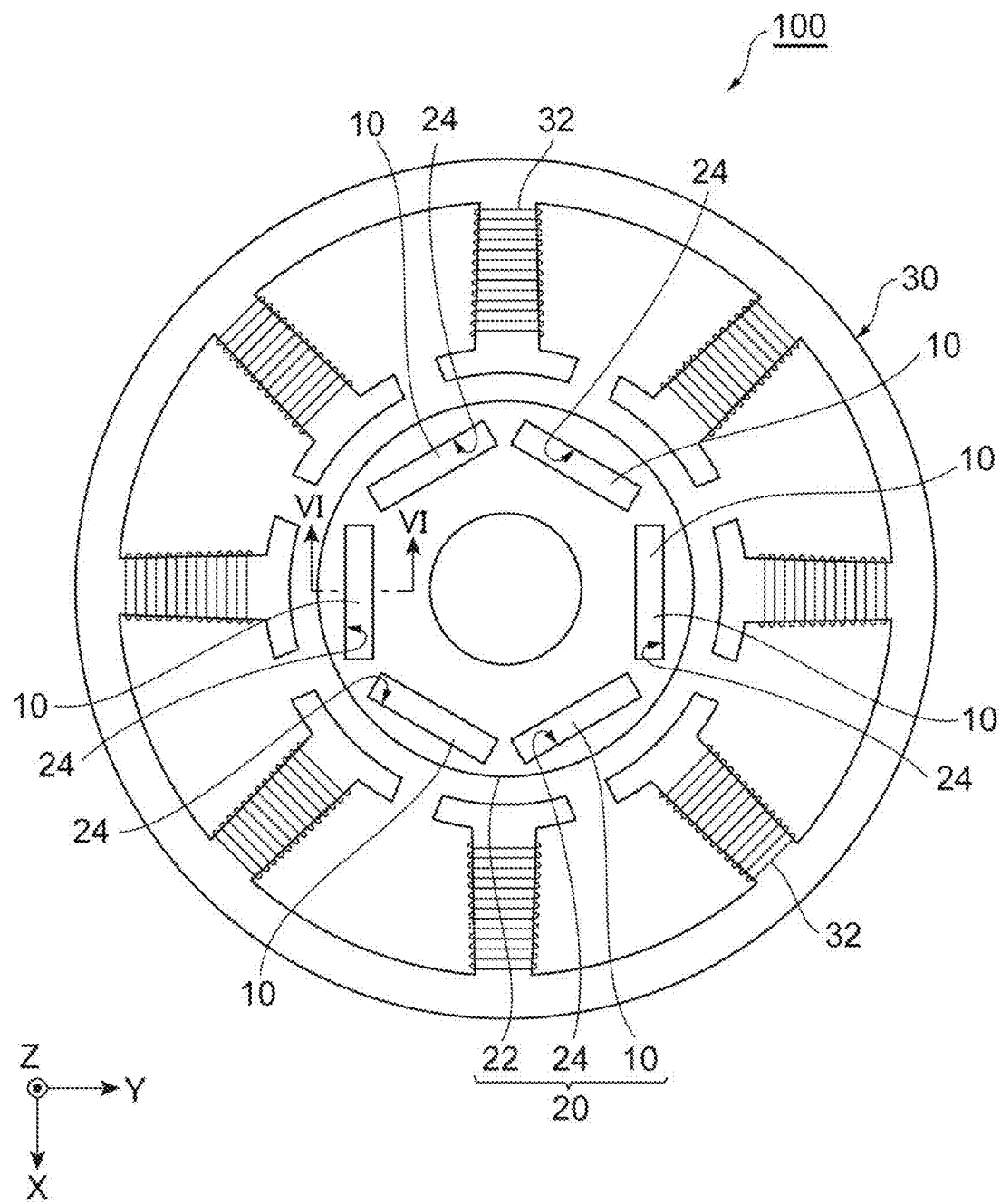
FIG. 5 shows an internal structure of a motor obtained by a manufacturing method according to an embodiment of the present invention.

As shown in FIG. 5, the permanent magnet 10 according to the present embodiment may be used for a motor 100. The motor 100 shown in FIG. 5 is an IPM motor (Interior Permanent Magnet Motor). The motor 100 includes a cylindrical rotor 20 and a stator 30 disposed outside the rotor 20 so as to surround the rotor 20. FIG. 5 shows the internal structure of the motor 100 in the direction of the rotation axis (Z-axis direction) of the rotor 20. The rotor 20 has a cylindrical rotor core 22 and a plurality of permanent magnets 10. A plurality of housing holes 24 is formed at predetermined intervals along the outer peripheral surface of the rotor core 22, and each of the permanent magnets 10 is housed in each of the housing holes 24.

The permanent magnets 10 adjacent to each other along the circumferential direction of the rotor 20 are housed in the housing holes 24 so that the positions of the N pole and the S pole of each of the permanent magnets 10 are opposite to the N pole and the S pole of the adjacent permanent magnet 10. That is, the permanent magnets 10 adjacent to each other along the circumferential direction generate magnetic lines of force in directions opposite to each other along the radial direction of the rotor 20. Although the rotor 20 shown in FIG. 5 has six permanent magnets 10, the number (the number of slots) of the permanent magnets 10 possessed by the rotor 20 is not limited.

The stator 30 has a plurality of coil portions 32 provided at predetermined intervals along the outer peripheral surface of the rotor 20. The coil portion 32 and the permanent magnet 10 are arranged to face each other. The stator 30 applies a torque to the rotor 20 by electromagnetic action and the rotor 20 rotates in the circumferential direction. Although the stator 30 shown in FIG. 5 has eight coil portions 32, the number of the coil portions 32 (the number of slots) of the stator 30 is not limited.

The method of manufacturing the motor 100 according to the present embodiment includes a housing step and a second heating step in addition to the above-described preparation step, printing step and first heating step. The housing step is performed after the first heating step, and the second heating step is performed after the housing step.

Figure 6:
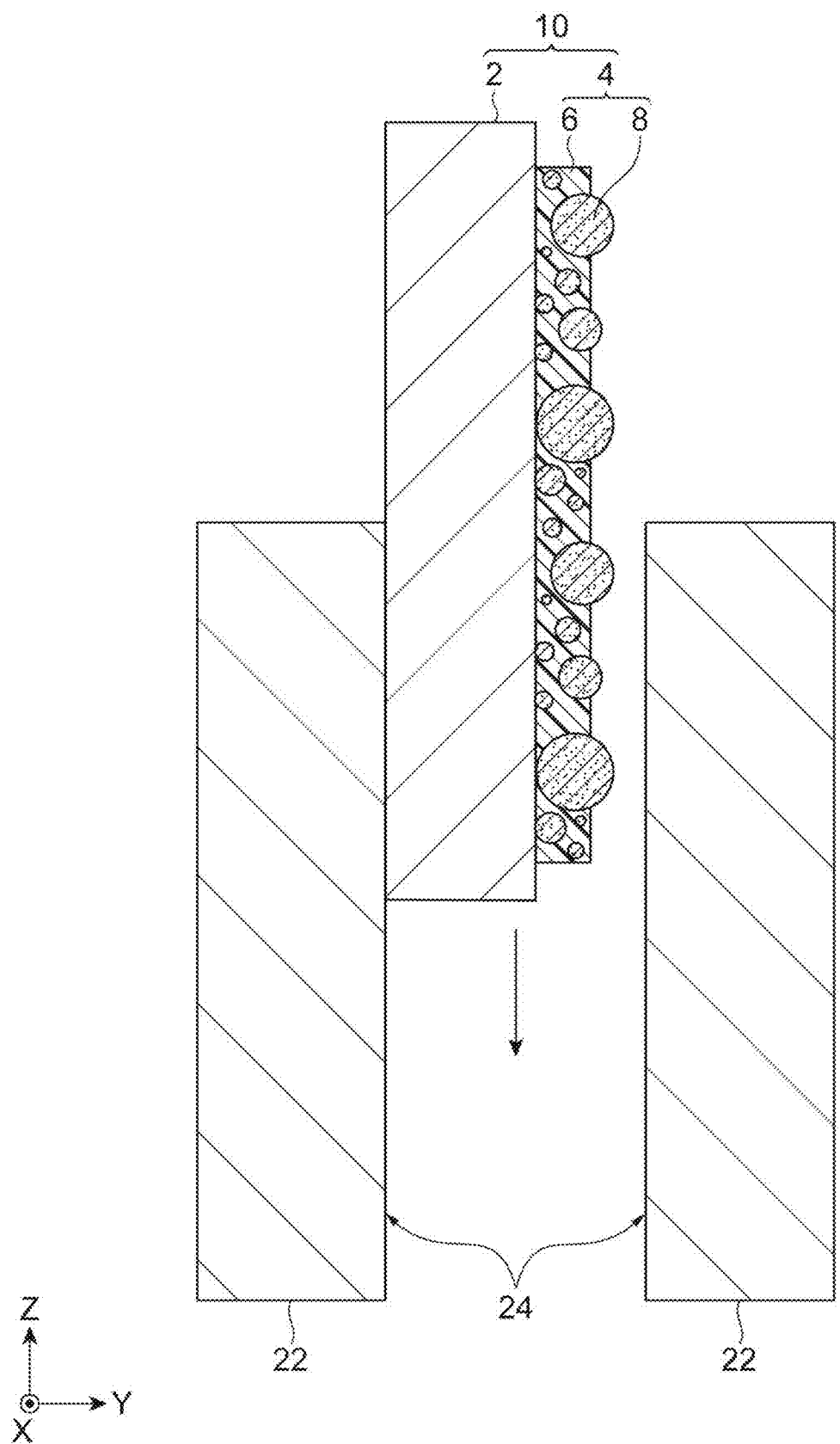
FIG. 6 is a cross-sectional view of a permanent magnet and a rotor core in the direction perpendicular to the surface of the adhesive layer, showing a process of inserting the permanent magnet into the housing hole of the rotor core.

As shown in FIG. 6, in the housing step, the permanent magnet 10 is inserted into each housing hole 24 formed in the rotor core 22. As described above, since at least part of the foaming agents 8 protrudes from the surface of the resin 6, the foaming agents 8 are likely to come into direct contact with the opening portion and the inner wall of the housing hole 24, and the resin 6 itself is less likely to come into direct contact with the opening portion and the inner wall of the housing hole 24. That is, since the foaming agents 8 protrude from the surface of the resin 6, point contact between the adhesive layer 4 and the housing hole 24 is likely to occur and surface contact between the adhesive layer 4 and the housing hole 24 is less likely to occur. Further, since the foaming agents 8 themselves having no adhesiveness come into direct contact with the opening portion or the inner wall of the housing hole 24, the adhesive layer 4 is hard to be caught on the inner wall of the housing hole 24. Even if the resin 6 is attached to the surface of the foaming agents 8 protruding from the resin 6, the adhesive layer 4 is less likely to be caught on the opening portion and the inner wall of the housing hole 24 since surface contact between the resin 6 and the housing hole 24 is less likely to occur. For the above reasons, deformation and peeling of the adhesive layer 4 are suppressed. That is, an adhesion failure is suppressed by the present embodiment. Since an adhesion failure is suppressed, the clearance between the permanent magnet 10 and the inner wall of the housing hole 24 can be reduced.

Figure 7:
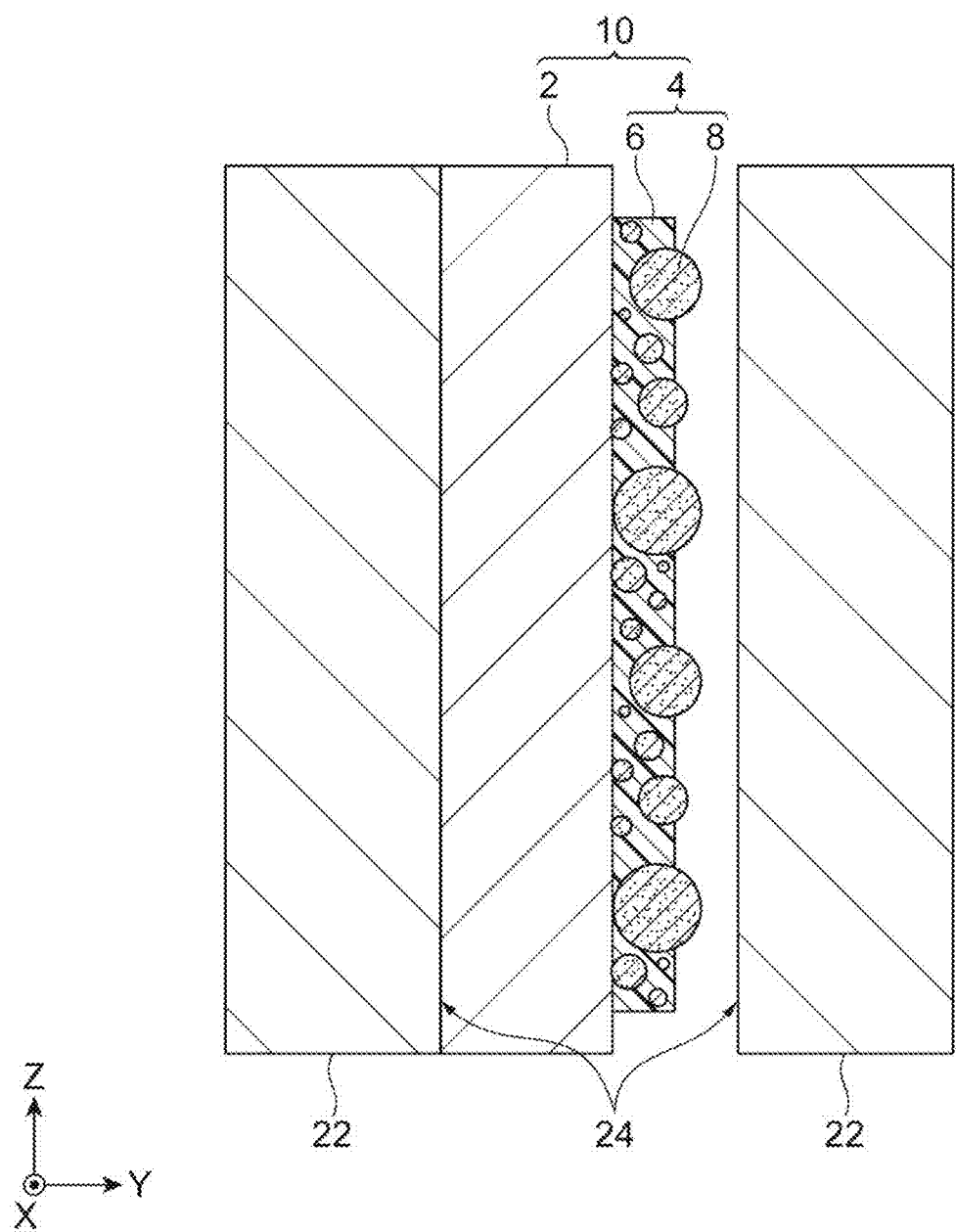
FIG. 7 is a cross-sectional view of the permanent magnet and the rotor core in the direction perpendicular to the surface of the adhesive layer, showing the permanent magnet before the foaming agent contained in the adhesive layer foams.
Figure 8:
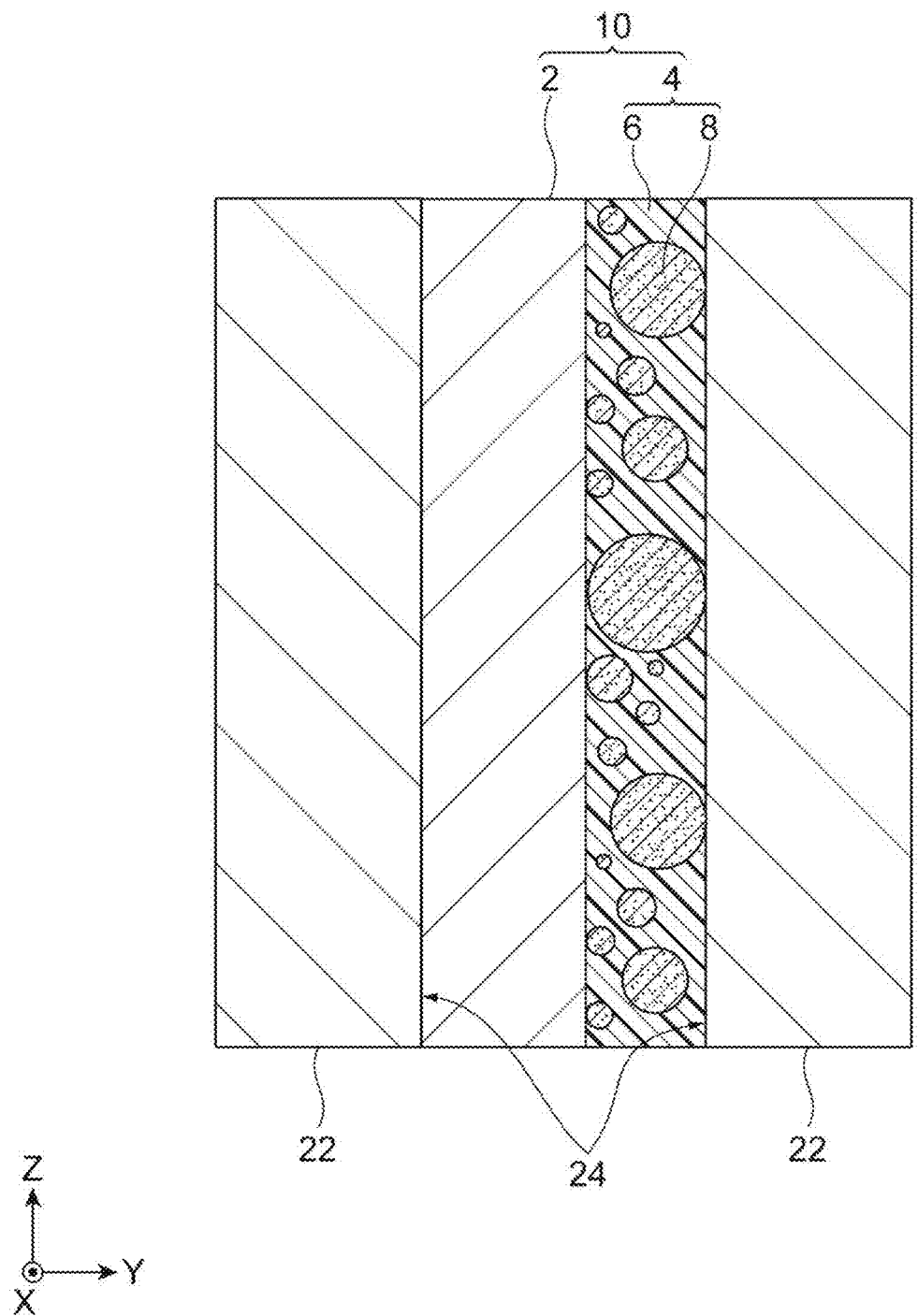
FIG. 8 is a cross-sectional view of the permanent magnet and the rotor core in the direction perpendicular to the surface of the adhesive layer, and shows the permanent magnet after the foaming agent contained in the adhesive layer foams and the thermosetting resin contained in the adhesive layer is cured.

As shown in FIG. 7, after the permanent magnet 10 reaches a desired position in the housing hole 24 in the housing step, a second heating step is performed. In the second heating step, heating the adhesive layer 4 foams foaming agents 8 contained in adhesive layer 4, and further cures the thermosetting resin contained in the adhesive layer 4. As shown in FIG. 7 and FIG. 8, the entire adhesive layer 4 expands as the foaming agents 8 foam. The adhesive layer 4 fills the clearance between the magnet member 2 and the inner wall of the housing hole 24 due to the expansion of the adhesive layer 4. The resin 6 is further cured in parallel with foaming of the foaming agents 8 and expansion of the adhesive layer 4. As a result, the magnet member 2 is adhered to the inner wall of the housing hole 24 with the cured product of the resin 6 (C stage resin) disposed therebetween. That is, the permanent magnet 10 is fixed at a desired position in the housing hole 24.

In the second heating step, the adhesive layer 4 may be heated at the temperature at which the foaming agents 8 foam, and the resin 6 is cured. In the second heating step, the adhesive layer 4 may be heated at 100° C. or more and 200° C. or less. The time to heat the adhesive layer 4 at the above temperature in the second heating step may be 10 minutes or more and 120 minutes or less. In the second heating step, the entire rotor core 22 including the adhesive layer 4 may be heated.

Through the above steps, the rotor 20 is completed. The motor 100 is completed by combining the rotor 20 and the stator 30.

Although the preferred embodiments of the present invention have been described above, the present invention is not necessarily limited to the above-described embodiment.

For example, a plurality of adhesive layers may cover the surface of the magnet member. That is, one adhesive layer may cover part of the surface of the magnet member, and another adhesive layer may cover the other part of the surface of the magnet member. When the magnet member is in the form of a plate, both sides (front and back) of the magnet member may be covered with an adhesive layer.

Figure 9:
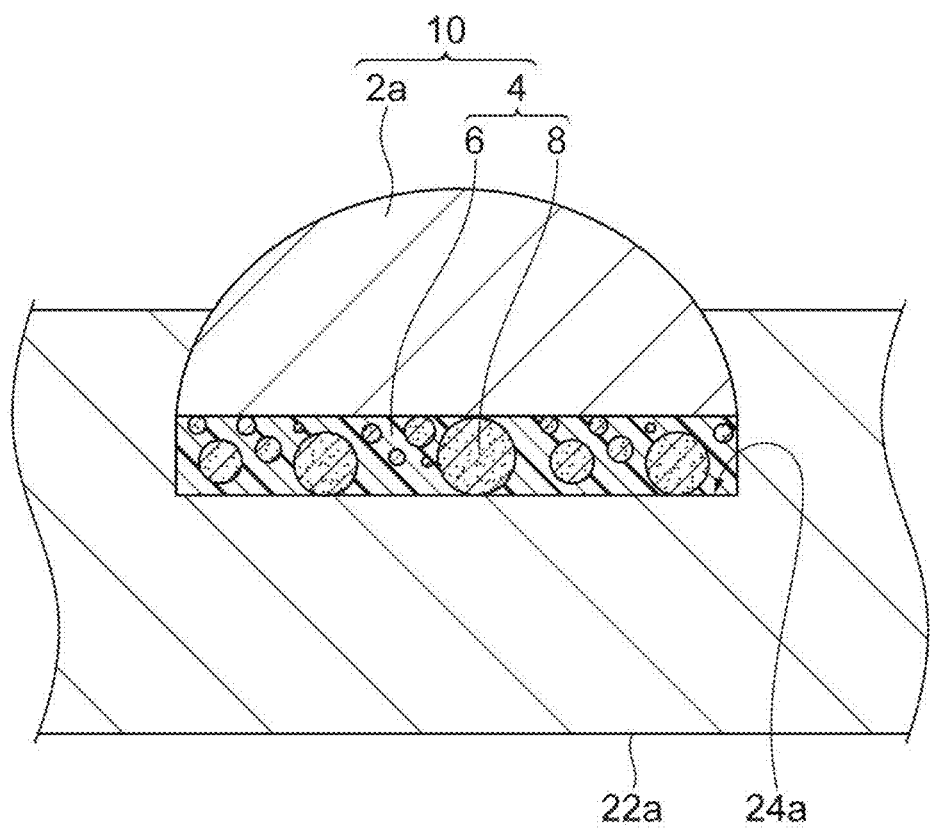
FIG. 9 is a cross-sectional view of the permanent magnet and the rotor core in the direction perpendicular to the surface of the adhesive layer, showing a modification of the permanent magnet and the rotor core.
Figure 9:
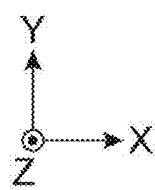

The housing hole implies a recess or groove. For example, as shown in FIG. 9, a groove 24a (recess) into which the permanent magnet 10a is fitted may be formed on the surface (outer peripheral surface) of a rotor core 22a. The permanent magnet 10a is inserted into the groove 24a, and is fixed to the surface (outer peripheral surface) of the rotor core 22a with the adhesive layer 4 interposed therebetween. A motor having the rotor core 22a is an SPM motor (Surface Permanent Magnet Motor). The motor is not limited to a permanent magnet synchronous motor, such as the IPM motor and the SPM motor. The motor may be a permanent magnet direct current motor, a linear synchronous motor, a voice coil motor, or a vibration motor.

The permanent magnet according to the present invention may be used, for example, in an IPM motor.

REFERENCE SIGNS LIST

2 Magnet member
3 Screen mesh
4 Adhesive layer
5 Frame
6 Resin
7 Mesh
8 Foaming agent
10, 10a Permanent magnet
20 Rotor
22, 22a Rotor core
24 Housing hole
24a Groove
30 Stator
32 Coil portion
100 Motor
$\varphi$ Width of foaming agent in the direction perpendicular to a surface of magnet member
T Thickness of resin in the direction perpendicular to a surface of magnet member

What is claimed is:

1. A permanent magnet comprising:
   a magnet member; and
   an adhesive layer covering a surface of the magnet member,
   wherein the adhesive layer includes a resin and a plurality of foaming agents, and
   wherein at least part of the foaming agents protrudes from a surface of the resin.

2. The permanent magnet according to claim 1,
   wherein at least part of the resin is a semi-cured material.

3. The permanent magnet according to claim 1,
   wherein at least part of the resin is a thermosetting resin.

4. The permanent magnet according to claim 1,
   wherein $\varphi$ is a width of at least part of the foaming agents in a direction perpendicular to the surface of the magnet member, and
   wherein T is a thickness of the resin in a direction perpendicular to the surface of the magnet member, and
   T is $0.5\varphi$ or more and less than $\varphi$.

5. A method of manufacturing a motor, the method comprising:
   a preparation step of obtaining a mixture containing a thermosetting resin and a plurality of foaming agents;
   a printing step of applying the mixture to a surface of a magnet member to form an adhesive layer on the surface of the magnet member;
   a first heating step of, by heating the adhesive layer, semi-curing the thermosetting resin contained in the adhesive layer to obtain a permanent magnet;
   a housing step of inserting, after the first heating step, the permanent magnet into a housing hole formed in a rotor core; and
   a second heating step of, by heating the adhesive layer after the housing step, foaming the foaming agent contained in the adhesive layer and further curing the thermosetting resin contained in the adhesive layer, wherein φ is a width of at least part of the foaming agents in a direction perpendicular to the surface of the magnet member, wherein T is a thickness of the resin in the direction perpendicular to the surface of the magnet member, and wherein in the printing step, T/φ is adjusted to a value greater than 0 and less than 1.

6. The method of manufacturing a motor according to claim 5, wherein the mixture is applied to the surface of the magnet member by screen printing in the printing step.

* * * * *